United States Patent

[11] 3,554,069

[72] Inventor Fred Wohlman, Jr.
Palos Verdes Estates, Calif.

[21] Appl. No. 747,704
[22] Filed July 25, 1968
[45] Patented Jan. 12, 1971

[73] Assignee Ex-Cell-O Corporation
Detroit, Mich.
a corporation of Michigan

[54] RECORD MEMBER PUNCH
5 Claims, 4 Drawing Figs.

[52] U.S. Cl. .......... 83/571, 234/92, 234/111
[51] Int. Cl. .......... G06k 1/10
[50] Field of Search .......... 83/549, 571—573; 234/92, 111, 100, 112, 113, 117, 118

[56] References Cited

UNITED STATES PATENTS

| | | | |
|---|---|---|---|
| 650,268 | 5/1900 | Norwood | 234/111 |
| 1,193,390 | 8/1916 | Hollerith | 234/112 |
| 2,957,380 | 10/1960 | Duncan et al. | 83/549 |
| 3,055,292 | 9/1962 | Byland | 234/100X |

*Primary Examiner*—William S. Lawson
*Attorney*—Christie, Parker & Hale

ABSTRACT: A punching device for recording binary coded information on a record member in a sequential fashion. The punching device having a punch and die assembly for perforating a record member wherein the punches may be independently selected and operated between punching and nonpunching positions. The record member to be punched is arranged to be incrementally stepped through the device and thereby punched.

INVENTOR.
FRED WOHLMAN, JR.
BY
Christie, Parker & Hale
ATTORNEYS.

INVENTOR.
FRED WOHLMAN, JR.
BY
Christie, Parker & Hale
ATTORNEYS

INVENTOR.
FRED WOHLMAN, JR.
BY
Christie, Parker & Hale
ATTORNEYS

INVENTOR.
FRED WOHLMAN, JR.
BY
Christie, Parker & Hale
ATTORNEYS

RECORD MEMBER PUNCH

This invention relates to a punch and more particularly to a manually operated punch for recording information on a record member.

Record members in the form of punched cards and punched paper tapes are extensively used in digital control systems. In the more sophisticated systems, automatic recording equipment is utilized for recording binary coded information on such record members in the form of punched-out apertures. One piece of automatic recording equipment is identified as the Friden "Flexowriter" wherein the record member is prepared or punched while it is being typed out. This automatic equipment, however, is expensive. One large use of punched record members such as paper tape is in systems for the numerical control of machine tools. Some small machine shops employ such numerically controlled tools but do not have automatic equipment for recording machine programs on the paper tape and the like, nor is it economical for these shops to acquire such equipment. In addition, the automatic equipment is usually employed for recording extensive control programs thereby rendering them economically feasible for the more sophisticated applications. In these small machine shops relatively limited programs and therefore small tapes are required and some inexpensive means for recording these control programs is desirable. In addition, these "paper" tapes are constructed of many different materials having varying wear properties at different times, then, it is necessary to make repairs, splices and corrections to these program tapes. Furthermore, it is sometimes necessary to duplicate the programs on a worn out tape onto a new tape and such duplication or recording is most conveniently accomplished on the machine site.

At the present time there is available manually operated punches for this purpose. The punches that are available, however, are capable of punching only a single binary bit at any one time and are relatively cumbersome to use. There are also available punches that allow a multiplicity of bits to be recorded at one time. These latter types of punches, however, employ a coded drum having a plurality of aligned punches arranged in preset combinations for recording purposes. This requires that a large number of punches and combinations of punches be provided along with some means for selecting a particular combination and thereby rendering such a punch relatively expensive. Accordingly, there is presently a need for an inexpensive, portable recording device preferably in the form of a punching device for recording binary coded information on paper tapes and similar record members. In particular, there is a need for manually operated, portable punch wherein more than one bit of information may be punched at one time in a relatively simple and inexpensive fashion.

The present invention provides an improved, inexpensive and portable punching device that is readily adapted for recording binary coded information on a paper tape. The punch of the present invention is adapted to record blocks of program information on the recording tape in the usual fashion by recording all of the binary coded bits in a line of the tape at one time.

From a structural standpoint the present invention broadly comprehends a punching device having a punch and die assembly wherein the assembly mounts a plurality of punches for independent movement from a nonpunching to a punching position. Means are included with the punching device for independently selecting a punch of the punch and die assembly for moving it into a punching position so that all selected punches are operative substantially simultaneously. The punch further includes means for resetting the selected punches to a nonpunching position.

These and other features of the present invention may be more fully appreciated when considered in the light of the following specification and drawings, in which.

Figure 1:
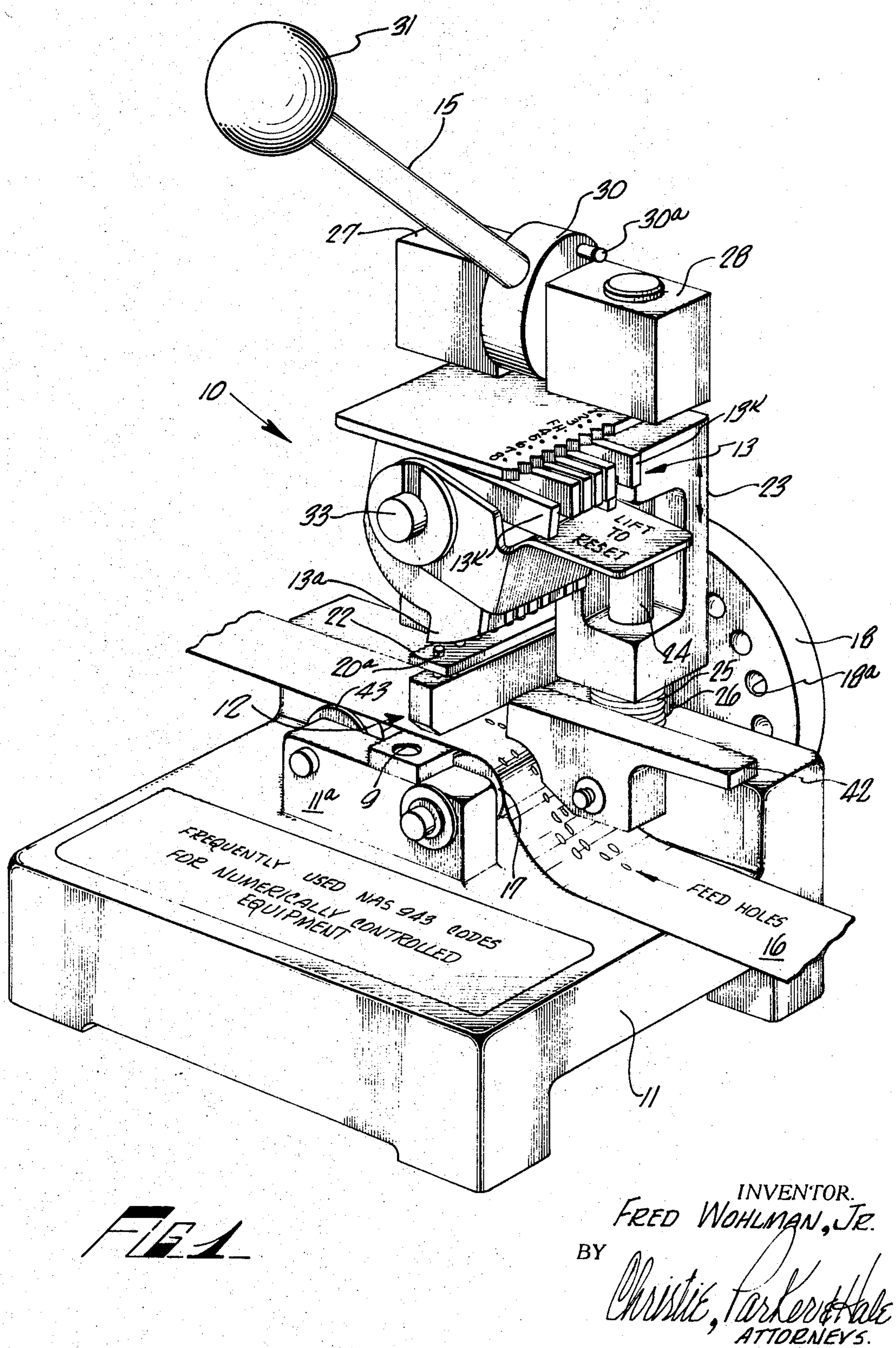
FIG. 1 is a perspective view of the punching device embodying the present invention and illustrating a record member in position to be punched.

Now referring to the drawings, the punch of the present invention will be specifically examined in detail. The punch 10 of the present invention comprises a base member 11 mounting a punch and die assembly 12 arranged with punch selection elements or keys 13 and a key resetting element 14. The punches of the punch and die assembly 12 are placed in a punching or nonpunching position by means of the punch-operating arm 15. The punch 10 is illustrated with a record member or tape 16 (in FIG. 1) in a position to be punched and is illustrated mounted over a sprocket assembly 17 engageable with the feed holes of the punched tape 16. The sprocket assembly 17 is manually controlled by means of an indexing control knob 18 for rotating the sprocket assembly 17 in preselected increments and to secure the assembly in position during the punching operation.

The punch and die assembly 12 of the present invention comprises a plurality of similarly defined punches 20 arranged to be independently slidable in the vertical guide element 21 having a plurality of apertures for receiving the individual punches. The upper extremity of the punch is secured by means of a stripper element 22 spaced in vertical alignment with the element 21 immediately above the element 21. The stripper element 22 is also provided with a plurality of apertures for slidably holding the individual punches 20 at their upper ends, nonpunching ends. The construction of the punches 20 is such that it includes a head $20^a$ at its outer end or the end opposite from the punching end to function as a stop in its downward travel to the punching position. The head $20^a$ abuts against the upper surface of the stripper element 22 upon traveling to the punching position. Below the head $20^a$ for each punch 20 there is defined a reduced section $20^b$ that extends below the lower surface of the stripper element 20 to function as a track for the movement of the punches 20 during their travel between the nonpunching to a punching position and return.

The punch and die assembly 12 is mounted over a punching block or anvil 9 secured to the upstanding member $11^a$ of the base 11. The anvil 9 receives the punching end of the punches 20 in the conventional fashion.

For operating the punch and die assembly 12 there is provided a slide element 23 mounted on the base element 11. The slide element 23 comprises a block mounted on a pair of posts 24 so as to be slidable thereon. Each post 24 includes a compression spring 25 mounted between the base 11 and the bottom surface of the block 23 to resiliently restrain the slide 23. A stop member shown as a threaded fastener 26 is also secured to the base 11 and is arranged to define the lower limit of travel of the slide 23. The slide 23 further mounts the operating arm 15 which is secured between a pair of blocks 27 and 28 fixedly secured to the posts 24. The operating arm 15 is further provided with a cam element 30 securing the inner end of the operating arm 15 and mounted between the blocks 27 and 28. The cam 30 includes a stop element, illustrated as a pin $30^a$, extending from the flat faces of the cam 30 so as to engage the upper surface of the blocks 27 and 28 when the arm 15 is rotated to a punching position and thereby define the lower extremity of the operating arm 15; see FIG. 2. The arm 15 may be secured to the cam 30 in any convenient fashion and is illustrated as being welded thereto by means of the weld 32. The outer end of the operating arm 15 is provided with a ball 31 secured thereto for facilitating operation of the punch 10. The cam is defined with a flat profile $30^b$ such that when the arm is in the nonpunching position illustrated in FIG. 1 that the surface $30^b$ lies parallel to the top surface of the slide 23. Upon rotation of the operating arm 15 in a counterclockwise direction, the rotation of the cam 30 is such that the face $30^b$ is moved out of the path of the slide 23 and the surface $30^c$ engages and forces the slide 23 downward along the posts 24 until stops $30^a$ arrest the movement of the operating arm 15; see FIG. 2.

Figure 3:
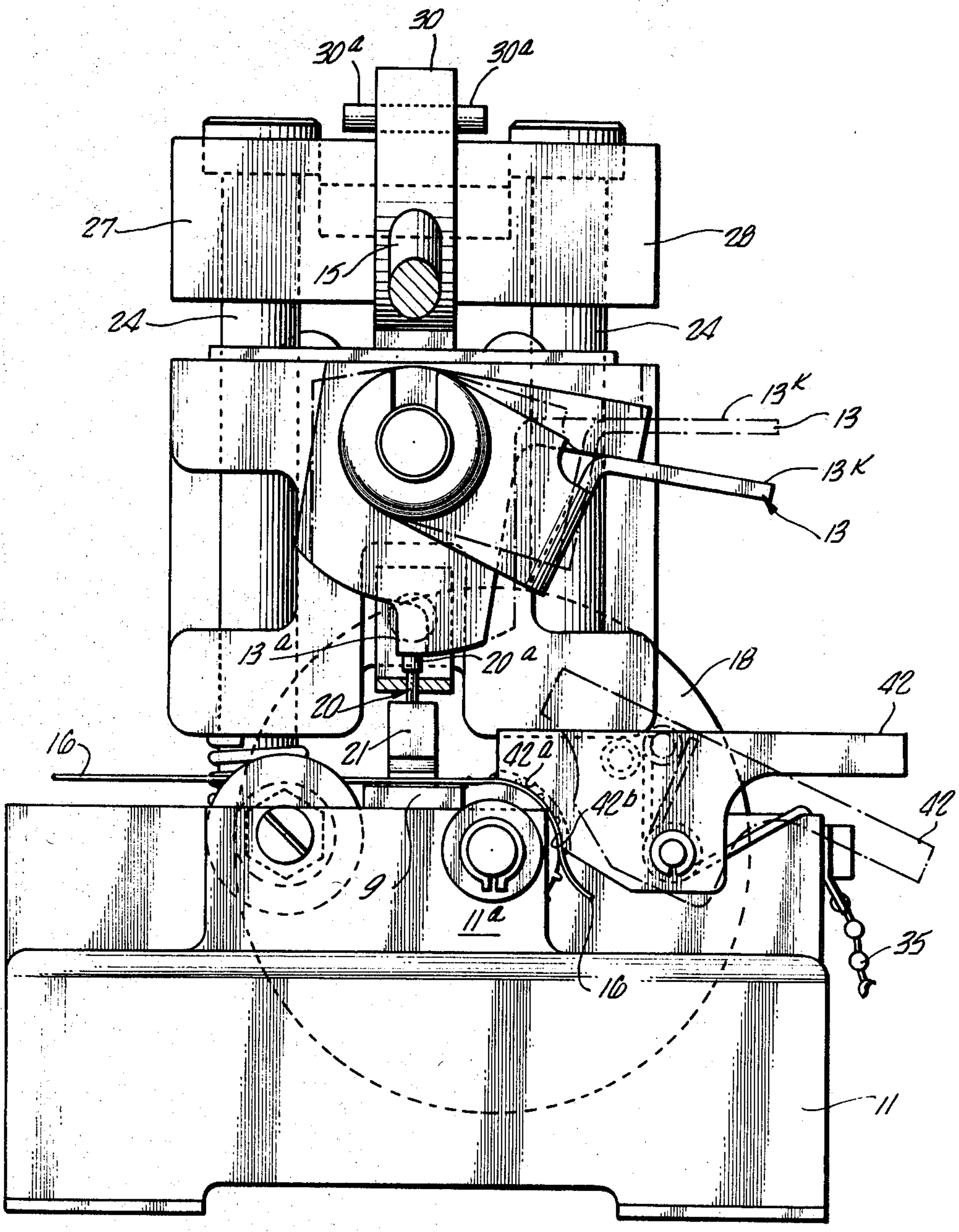
FIG. 3 is a front elevational view, with portions broken away, of the device illustrated in FIG. 1.

The slide 23 further mounts a plurality of punch selection elements or the keys 13, one for each punch 20. In this instance since the punching device 10 is particularly adapted for recording information on paper tapes employed in machine tool applications wherein eight information channels are conventionally used along with a feed hole channel, nine punches 20 and nine selection keys 13 are employed. Each of the keys 13 are rotatably mounted on a shaft 33 journaled to the slide 23. Each of the keys 13 have a generally L-configuration and are mounted to the shaft about the junction of the two arms of the L to select an individual punch 20. A key 13 is illustrated in the punch selection position in FIG. 3 where it engages the top surface of the punch head $20^a$. The nonselecting punch position is illustrated in dotted outline wherein it assumes a position spaced from the punch head $20^a$ at all times including when the operating arm is moved to the punching position. The punch selection or operating ends of the keys 13 are better identified by the reference numeral $13^a$, while the selection ends of the keys 13 are identified by the reference character $13^k$. When key 13 is to be selected the key end $13^k$ is moved downwardly or rotated in a clockwise direction about the shaft 13 so as to place the punching operating end $13^a$ of the keys immediately above the punch heads $20^a$ to cause them to engage the punch head $20^a$ upon movement of arm 15 into punching position. The construction of the keys 13 is such that for a nonoperated key 13, i.e., one that is not rotated about the shaft 33, the punch operating end $13^a$ is spaced laterally from the punch head $20^a$ such that upon the movement of the operating arm 15 into a punching position, the key end $13^a$ is positioned laterally adjacent the punching head $20^a$ in a nonengaging relationship.

The shaft 33 further mounts a reset key 14 which is a common key for resetting all of the selected keys 13 to a nonselecting position. The resetting key 14 is of a generally L-shaped configuration having a lifting lip $14^a$ extending outwardly thereof for engaging the bottom sides of the ends $13^k$ of the keys 13 and moving them in a clockwise direction for resetting the keys to a nonselecting position.

Figure 2:
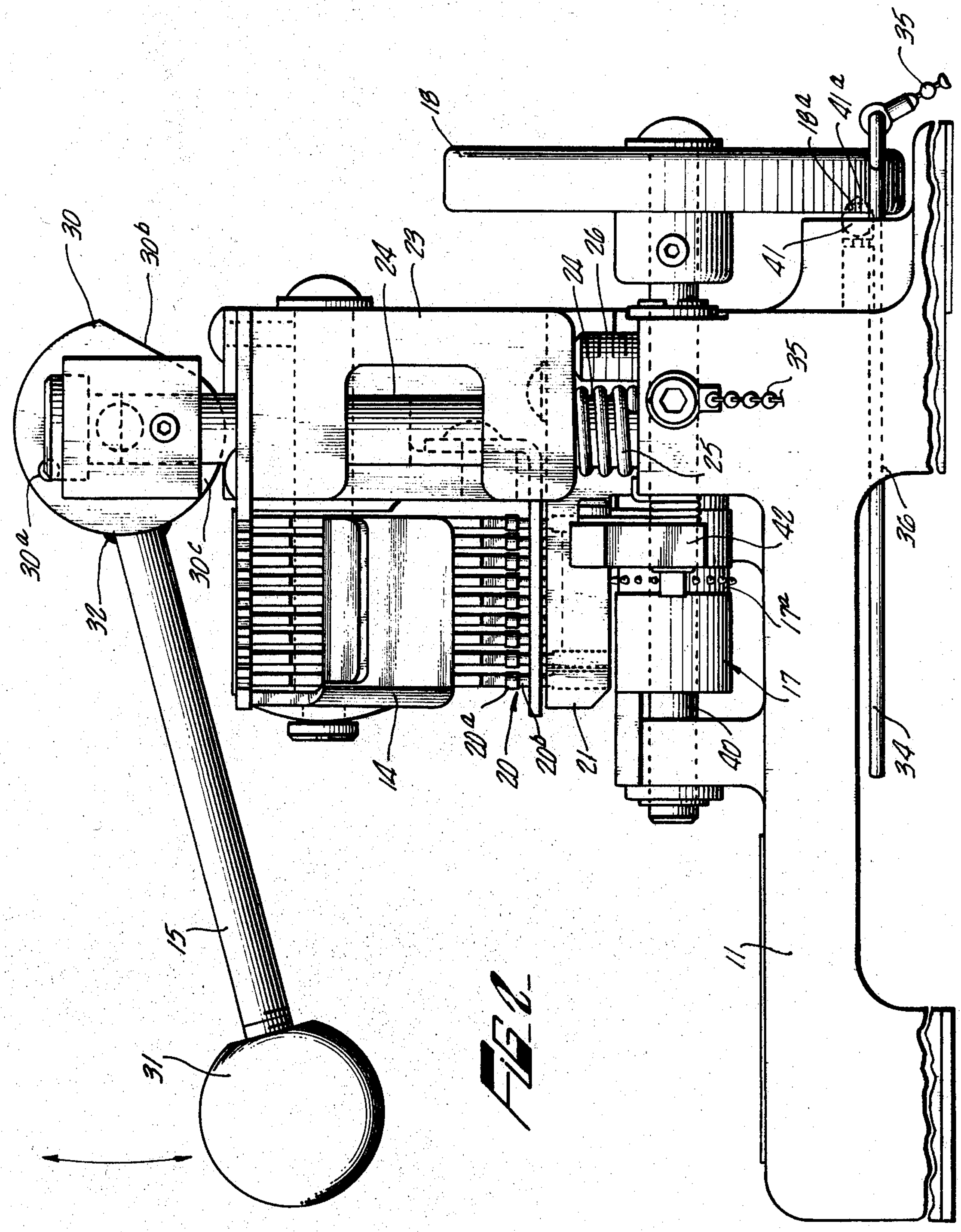
FIG. 2 is a right-hand end elevational view with portions broken away, of the punch illustrated in FIG. 1 and with the punch operating arm illustrated in punching position.

The keys may be conveniently identified relative to the usual information channels 1 through 8 for the paper tape 16 along with the sprocket or feed hole channel. The selection of the keys 13 is further facilitated through the provision of a selector pin 34. The selector pin 34 is an elongated member that may be used to engage the top surfaces $13^k$ of the keys 13 for rotating the keys clockwise. The provision of the selector pin 34 assures that only one key 13 is selected. The selector pin 34 may be secured to the base 11 by means of a chain 35 secured to the base. The selector pin 34 can also be carried by the base 11 by means of an aperture 36 defined to slidably receive the pin 34 as best illustrated in FIG. 2.

The base 11 as indicated hereinabove mounts the sprocket assembly 17. The sprocket assembly 17 comprises a sprocket wheel $17^a$ rotatably journaled on the same shaft 40 to which the indexing control wheel 18 is secured. The indexing control wheel 18 is secured to the end of the shaft 40 extending outwardly of the base 11. The opposite end of the shaft 40 is suitably journaled and mounted to the base 11 at the upstanding member $11^a$, as illustrated. The rotation of the indexing wheel 18 then causes the sprocket $17^a$ to be rotatable therewith. The indexing wheel 18 is constructed and defined to be incrementally rotated and is secured in each incremental position by means of a detenting mechanism 41 carried by the base 11 adjacent the indexing wheel 18. The illustrated indexing mechanism 41 includes a detenting ball $41^a$ that is engageable with the complementary sockets $18^a$ defined on the inner face of the control wheel 18. The sockets $18^a$ are spaced adjacent the outer periphery of the wheel 18 as best illustrated in FIG. 1 and are spaced apart a distance corresponding to the desired incremental distance between the lines of recorded information on the record member 16. For the conventional recording of information on the paper tape, the sockets $18^a$ are spaced so as to index the record member 16 a distance of 0.100 inch with each incremental rotation of the wheel 18.

To assure that the record member 16 is properly indexed and held in the indexed position for the punching operation, there is provided a tape guide lever 42 arranged adjacent the sprocket assembly 17. The tape guide lever 42 is rotatably secured to the base element 11. The tape guide lever 42 includes arcuate slots $42^a$ defined on the arcuate face $42^b$ of the lever 42 or the face that overlies the sprocket wheel $17^a$. The arcuate slot $42^a$ is defined to accept the indexing elements of the sprocket wheels $17^a$ and allow them to freely rotate without any interference from the lever 42. The position of the tape guide lever 42 for punching is best illustrated from examining FIGS. 1 & 3.

Figure 4:
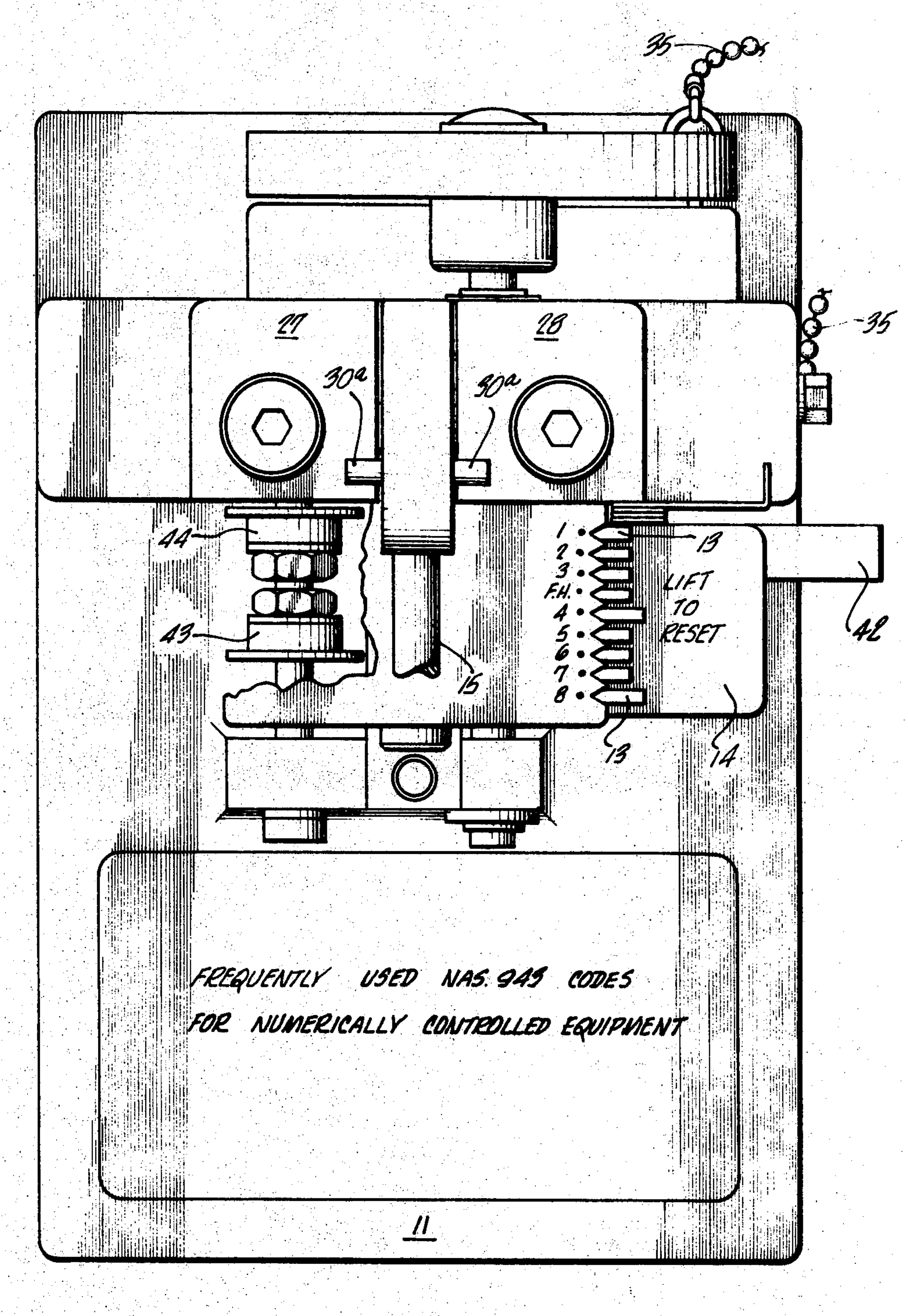
FIG. 4 is a top plan view, with portions broken away, of the punching device of FIG. 1.

The punch 10 is adapted to accept record members or paper tapes of varying widths and for this purpose tape guide wheels 43 and 44 are provided. The tape guide wheel 43 is secured to the base 11 on the same upstanding element $11^a$ as the sprocket assembly 17 is journaled. The tape guide wheel 43 coacts with the guide wheel 44 spaced inwardly therefrom, as best illustrated in FIG. 4. The guide wheel 44 is secured in a fixed position to guide one edge of the record member to be punched while the guide wheel 43 is adapted to be movable to accommodate tapes of varying widths.

In the conventional manually operated punches, it has been conventional to define the punching end of the punch in some arcuate fashion to aid in its progress through the record member. None of these conventional punches employ a flat punching head. An important aspect of the present invention is that each of the punching heads for the punches 20 are defined with a flat punching head. In addition, to reduce the amount of pressure required on the operating arm 15 to allow the simultaneous punching of all of the bits of information into a record member, the punches are defined with varying lengths. Specifically, four of the nine punches may be defined with a shorter length than the remaining punches. Since the punches all have the same punching stroke, the longer punches will pierce the record member 16 slightly before the shorter punches reach the surface of the tape and thereby reducing the amount of pressure to effect the punching of all of the bits in a single line substantially simultaneously.

With the above structure in mind, the operation of the punch 10 will be reviewed. To prepare the punch 10 for a recording operation, the record member or paper tape 16 is placed between the guide wheels 43 and 44 and under the punch block or anvil 9. The tape guide lever 42 is rotated to allow the tape 16 to be placed over the sprocket assembly 17 with the indexing pins or sprocket teeth engaged at the feed holes for the tape 16. The guide lever 42 is then positioned over the tape to allow it to maintain the described relationship between the tape 16 and the sprocket assembly 17 during the travel over the guide wheels 43 and 44. The indexing wheel 18 may then be rotated until the tape 16 is positioned in the correct location for accepting the first line of information to be punched into the tape. The binary bits to be recorded at the selected line on the tape 16 may be determined by referring to a coding chart showing the required apertures and the location relative to the selected binary coding format. Such a format may be secured to the face of the base 11 for the punch 10 as indicated in particular in FIGS. 1 & 4. Assuming that the correlation between the coding format and the channels on the punch 10 is effected, the selector pin 34 may then be employed to depress the selected key 13 thereby reproducing the coding format with the keys 13. The selected keys 13 correspond to the binary zeros or the holes to be punched into the record member 16. The operating arm 15 may then be rotated in a counterclockwise direction to effect the punching operation. When the arm 15 is rotated to the punching position, the action of the cam 30 causes the slide 23 to move downwardly and thereby carries the keys 13 along with it to cause the ends $13^a$ of the keys 13 that have been selected to engage the punch heads $20^a$ for the selected punches 20. Those keys 13 that have not been selected will not have their respective ends $13^a$ engage the punches 20 and thereby the pattern assumed through the selection of the keys 13 will be transferred by means of the keys 13 to the punches 20 and thereby cause the series of holes that are punched in the record member 16 to be of the desired format. With the completion of the punching operation, the operating arm 15 is returned to its normal position and the keys 13 will be retracted from engagement with the punch heads $20^a$. During this interval, the stripper element 22 functions to retract the punches 20 from the tape 16 through the engagement of the stripper with the punch heads $20^a$ during the upward travel of the slide 23. Unless the identical piece of information is to be recorded on the successive line, the resetting key 14 is operated. To erase the selected key 13, the reset key 14 is rotated counterclockwise to engage the keys 13 and place them all in a nonselected position. The tape 16 can now be indexed to the next position through the rotation of the indexing wheel 18 a preselected increment until it is detented by means of the assembly 41. To record the next line of information, the keys 13 are again selected in accordance with the new coding pattern and the punching operation in the aforementioned steps may be repeated.

It should now be evident to those skilled in the art that the present invention has advanced the state of the art through the provision of an improved, manually operated inexpensive punch for recording information wherein all of the bits in a line on a record member may be recorded substantially simultaneously and in any desired format.

I claim:

1. A punching device for recording binary coded information on a record member in a sequential fashion comprising:

a base member;

a punch anvil mounted on the base member;

a die assembly mounted in a spaced relationship with the anvil to receive a record member to be punched between the anvil and the die assembly;

a plurality of punches, said die assembly having a plurality of apertures for slidably receiving the plurality of punches;

a punch operating slide movably mounted on the base member from a nonpunching position to a punching position;

means for moving the slide between its positions;

a plurality of punch selection elements movably mounted on the slide;

the selection elements being independently movable from a punch engaging position to a nonengaging position and return for engaging a punch to be operated in response to the operation of the slide;

means mounted on the slide for resetting the selection elements to a nonengaging punch position;

means mounted on the slide for retracting the punches to a nonpunching position in response to the movement of the slide to a nonpunching position; and means for incrementally stepping a record member to be punched between the anvil and die assembly.

2. A punching device as defined in claim 1 wherein the stepping means comprises a manually operated sprocket rotatably mounted on the base member and engageable with perforations in the record member to positively step the record member, and an indexable means secured to the sprocket for manually and incrementally stepping the sprocket.

3. A punching device as defined in claim 2 including means for holding the record member in engagement with the sprocket.

4. A punching device as defined in claim 1 wherein the punches are constructed and defined with a flat punching surface and having its opposite end defined with a head for engagement with the retracting means.

5. A punching device as defined in claim 4 wherein a preselected number of the punches are of a different length than the other punches.